(12) United States Patent
Maurus

(10) Patent No.: US 9,963,891 B2
(45) Date of Patent: May 8, 2018

(54) MODULAR INFRASTRUCTURE DEVICE, INFRASTRUCTURE SYSTEM AND METHOD FOR OPERATING AN INFRASTRUCTURE DEVICE

(71) Applicant: Tobias Maurus, Stuttgart (DE)

(72) Inventor: Tobias Maurus, Stuttgart (DE)

(*) Notice: Subject to any disclaimer, the term of this patent is extended or adjusted under 35 U.S.C. 154(b) by 0 days. days.

(21) Appl. No.: 15/436,518

(22) Filed: Feb. 17, 2017

(65) Prior Publication Data

US 2017/0159306 A1 Jun. 8, 2017

Related U.S. Application Data

(63) Continuation of application No. PCT/EP2014/067583, filed on Aug. 18, 2014.

(51) Int. Cl.
*E04H 1/12* (2006.01)
*E04B 1/18* (2006.01)

(52) U.S. Cl.
CPC .............. *E04H 1/1205* (2013.01); *E04B 1/18* (2013.01)

(58) Field of Classification Search
CPC .................................. E04H 1/1205; E04B 1/18
See application file for complete search history.

(56) References Cited

U.S. PATENT DOCUMENTS

| | | | | |
|---|---|---|---|---|
| 3,060,519 A | * | 10/1962 | Francis | B60J 11/00 135/90 |
| 5,109,643 A | * | 5/1992 | Speers | E04L 37/00 52/220.3 |
| 5,998,963 A | * | 12/1999 | Aarseth | B60K 1/04 104/34 |
| 6,193,154 B1 | | 2/2001 | Phillips et al. | |
| 7,392,816 B2 | * | 7/2008 | Porter | A45B 23/00 135/117 |
| 7,913,710 B2 | * | 3/2011 | Bougioukos | E04H 6/025 135/87 |
| 8,011,140 B2 | * | 9/2011 | Durham | E04H 6/025 135/90 |
| 2004/0074157 A1 | * | 4/2004 | Chazal | E04B 1/3416 52/66 |
| 2010/0050541 A1 | * | 3/2010 | Bright | E04H 1/1211 52/73 |

FOREIGN PATENT DOCUMENTS

| | | |
|---|---|---|
| CN | 203 308 123 U | 11/2013 |
| DE | 42 13 414 A1 | 10/1993 |
| DE | 10 2008 052 827 A1 | 5/2010 |
| DE | 10 2012 015 192 A1 | 4/2013 |
| DE | 10 2011 056 651 A1 | 6/2013 |

* cited by examiner

*Primary Examiner* — Jeanette E Chapman
(74) *Attorney, Agent, or Firm* — Aslan Law, P.C.

(57) ABSTRACT

In order to provide an infrastructure device which is of variable design and can be used and extended in a flexible way, it is proposed that the infrastructure device is of modular design and comprises at least one base unit and one or more infrastructure units.

7 Claims, 6 Drawing Sheets

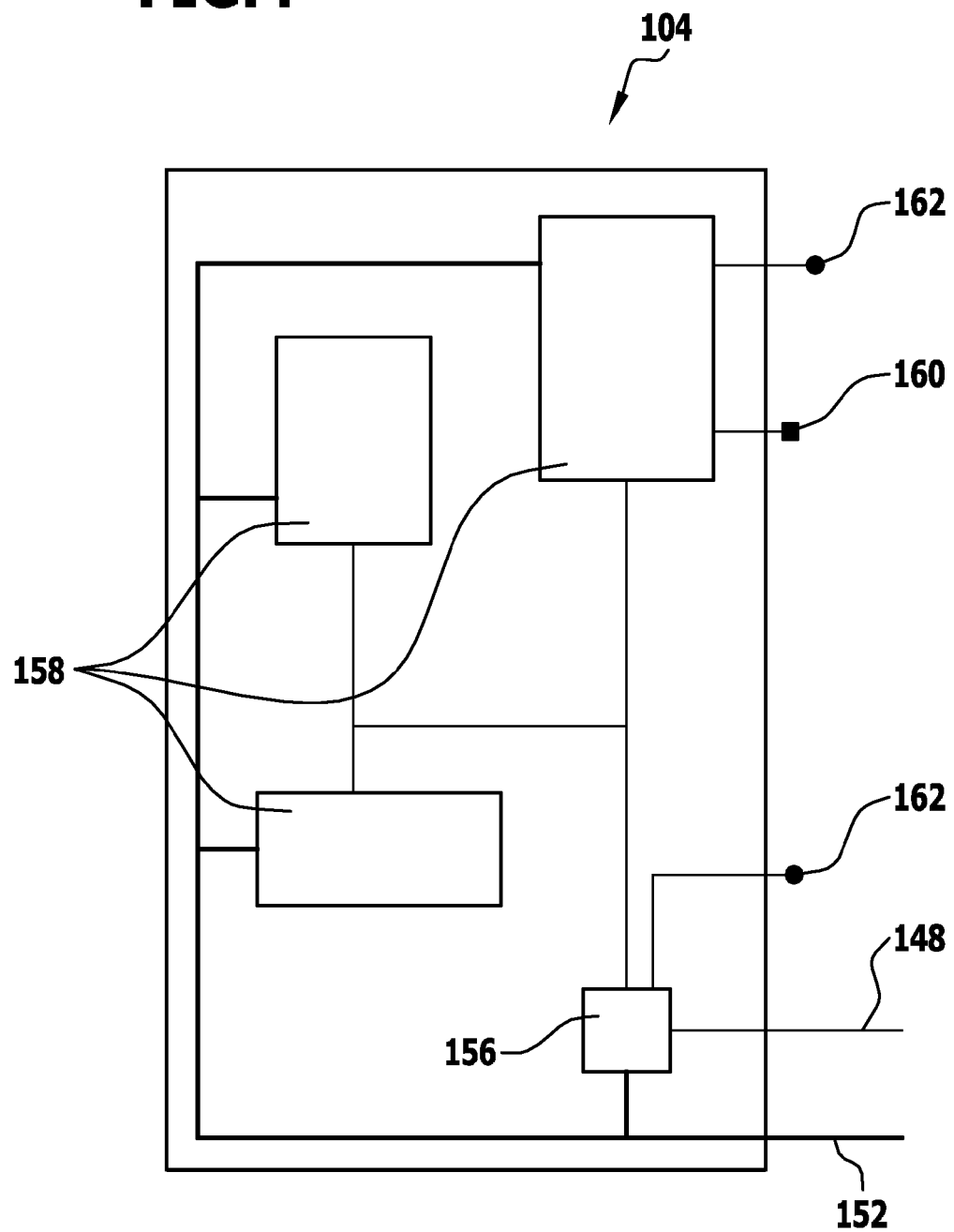

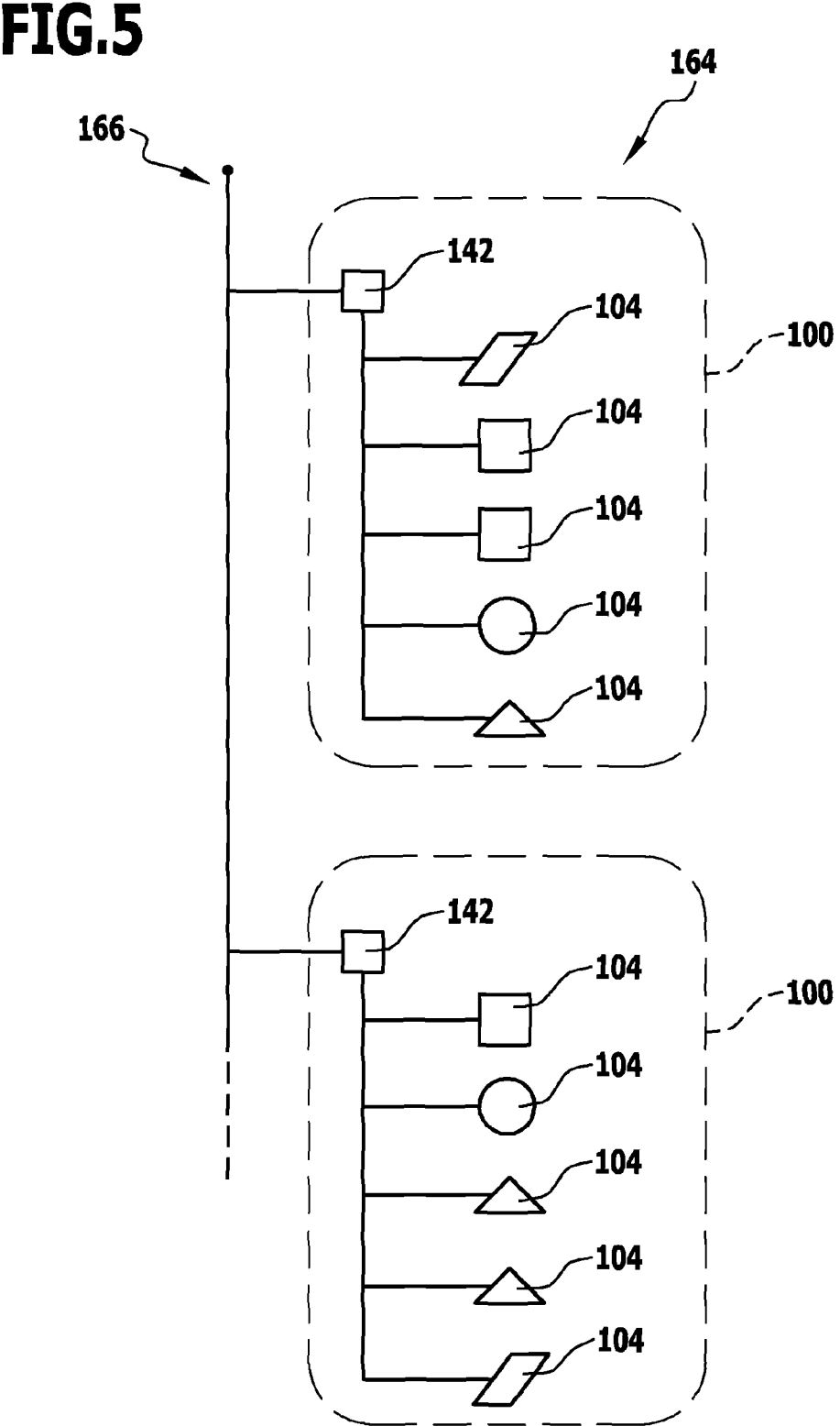

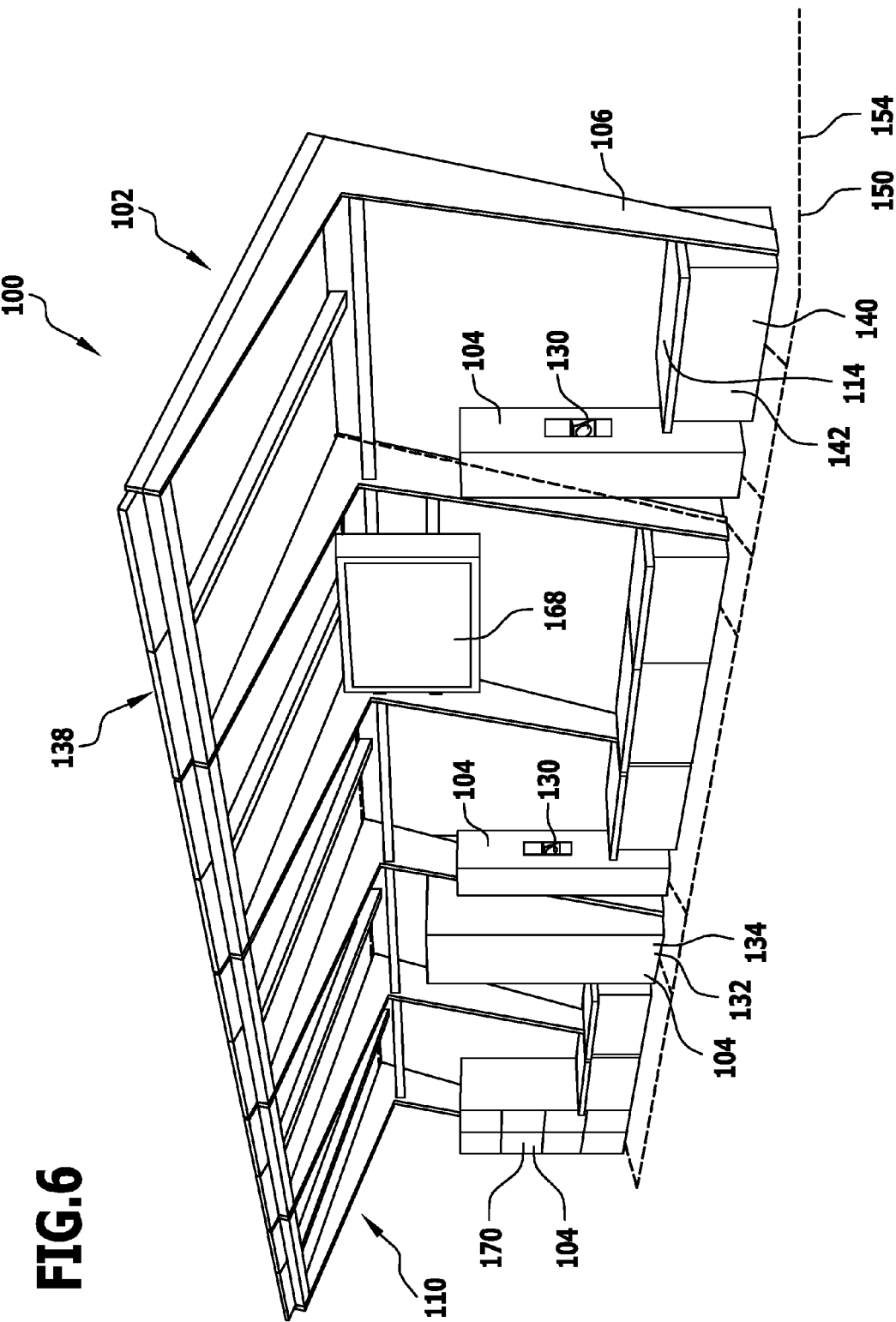

MODULAR INFRASTRUCTURE DEVICE, INFRASTRUCTURE SYSTEM AND METHOD FOR OPERATING AN INFRASTRUCTURE DEVICE

RELATED APPLICATION

This application is a continuation of international application No. PCT/EP2014/067583 filed on Aug. 18, 2014 which is incorporated herein by reference in their entirety and for all purposes.

FIELD OF DISCLOSURE

The present invention relates to an infrastructure device. Such an infrastructure device serves, in particular, to supply persons or objects with consumables. For example, service stations for supplying vehicles with fuels and/or electricity are to be considered as an infrastructure device.

BACKGROUND

The present invention is based on the object of providing an infrastructure device which is of variable design and can be used and extended in a flexible way.

SUMMARY OF THE INVENTION

This object is achieved according to the invention by means of an infrastructure device which is of modular design and comprises at least one base unit and one or more infrastructure units.

The one or more infrastructure units preferably serve to supply persons or objects with electrical energy, data, information, food products, commodities and/or consumables. In addition, there can be provision that one or more infrastructure units serve to store objects.

The one or more infrastructure units, in particular the entire modular infrastructure device, is preferably embodied and arranged in a stationary manner.

The infrastructure device is preferably a contact point or stopping point for persons or objects at which the supply of electrical energy, data, information, food products, commodities and/or consumables takes place.

The base unit comprises, in particular, a frame or a rack for accommodating and/or arranging one or more infrastructure units.

In addition, the base unit preferably serves to accommodate and/or arrange one or more energy supply units, in particular independent supply units, of the infrastructure device.

The base unit preferably forms a roofing or at least partially or fully forms a housing for one or more infrastructure units of the infrastructure device.

In particular, there can be provision that a stopping area, in particular a roofed stopping area, is formed for persons and/or objects, for example vehicles, by means of the base unit.

One or more infrastructure units preferably comprise a communication unit, an information unit, a storage unit, a display unit and/or a provision device.

A provision device is, for example, a vending machine for selling food products, in particular meals and/or beverages, or consumables, in particular lubricants, cleaning agents, anti-freeze agents, etc. for vehicles.

A communication unit is, for example, an interaction unit by means of which a person can interact with the infrastructure device, in particular one or more infrastructure units.

Alternatively or additionally to this, there can be provision that a communication unit is a device by means of which a person can communicate with other persons.

An information unit is preferably a device by means of which information can be provided, in particular displayed, for a person. An information unit can be, for example, an advertising space or an advertising panel or an information display.

A storage unit is, in particular, a locker in which persons can deposit and safely store objects.

A display unit is, in particular, a display panel.

By means of a display unit it is preferably possible to display data which relates to the use or handling of one or more infrastructure units of the infrastructure device.

By means of a display unit it is possible for a person to obtain information, in particular, about a state of one or more infrastructure units or of the entire infrastructure device.

In one refinement of the invention, there can be provision that one or more infrastructure units comprise one or more connecting devices for connecting the one or more infrastructure units to one or more user units.

For example there can be provision that one or more infrastructure units comprise a wireless or wired connecting device in order to supply a user unit with, for example, data and/or electrical energy. In particular, in this way, a user unit which is embodied as a motor vehicle can be supplied with electrical energy and/or with liquid fuel.

The connecting device permits, in particular, an electrical connection between an infrastructure unit and a user unit.

Alternatively or additionally to this, there can be provision that one or more connecting devices permit a data connection and/or fluid-conducting connection between one or more infrastructure units and one or more user units.

Electrical energy, data, information, food products, commodities and/or consumables can preferably be provided for one or more user units and/or for one or more persons by means of one or more infrastructure units.

In particular, there can be provision that electrical energy, data, information, food products, commodities and/or consumables are configured to be dispensed to one or more user units and/or to one or more persons by means of one or more infrastructure units.

For example, there can be provision for this purpose that one or more user units are connectable to one or more infrastructure units by means of one or more connecting devices, in order, for example, to transmit electrical energy, to permit internet access or some other communication access or to transmit other information and data.

One or more user units can be embodied, for example, as motor vehicles.

In addition, there can be provision that one or more user units are smartphones or other portable electronic devices.

One or more user units are preferably mobile units.

An infrastructure for operating one or more user units is preferably provided by means of the modular infrastructure device.

It may be favorable if the modular infrastructure device comprises one or more independent supply units for generating and/or providing electrical energy.

An independent supply unit is, in particular, a photovoltaic unit, a wind turbine unit and/or an energy storage device.

By means of an independent supply unit, it is possible, in particular, to generate and/or provide energy for operating the modular infrastructure device and/or for supplying objects, in particular user units.

There can be provision that at least one base unit comprises a plurality of prepared receptacles and/or attachment points for accommodating and/or attaching different types of infrastructure units. Different infrastructure units can therefore be easily arranged on the base unit and put into operation. In particular, infrastructure units can also be easily retrofitted onto an already finished modular infrastructure device.

There can be provision that the at least one base unit of the modular infrastructure device is itself of modular design.

The base unit is thus, in particular, scalable and/or extendable.

For example there can be provision that a base unit comprises supporting elements and one or more roof elements which are embodied in such a way that, for example, already existing supporting elements have receptacles for further roof elements, providing simple and arbitrary extendibility of the base unit.

In one refinement of the invention there is provision that the modular infrastructure unit comprises a central unit which is coupled or couplable to the one or more infrastructure units, the one or more user units and/or the one or more independent supply units.

The central unit is preferably embodied and configured in such a way that operation, operator control and/or use of the one or more infrastructure units and/or one or more independent supply units are detected, open-loop and/or close-loop controlled and/or are signaled to a superordinate monitoring system by means of the central unit.

All the infrastructure units of the infrastructure device are preferably embodied and configured in such a way that an infrastructure service which is made use of by a person or a user unit is detectable by means of the central unit. In addition, user data and/or billing data are preferably detectable in order to be able to bill the infrastructure service which is made use of.

For example, billing by means of a payment system with RFID, insertion of coins, insertion of bank notes, magnetic card, credit card, smartphone connection (App) can be provided.

The modular infrastructure device is suitable, in particular, for use in an infrastructure system.

The present invention therefore also relates to an infrastructure system which comprises one or more modular infrastructure devices according to the invention.

The infrastructure system comprises, in particular, a superordinate monitoring system by means of which a plurality of infrastructure devices are configured to be open-loop controlled and/or closed-loop controlled and/or monitored.

The infrastructure system according to the invention preferably has individual or a plurality of features and/or advantages described in conjunction with the modular infrastructure device according to the invention.

The present invention also relates to a method for operating one or more infrastructure devices. The invention is aimed in this respect at providing a method by means of which one or more infrastructure devices are operable easily and efficiently.

This object is therefore achieved according to the invention in that the method for operating one or more infrastructure devices, in particular modular infrastructure devices according to the invention, comprises the following: Providing one or more infrastructure units for an infrastructure device for supplying persons or objects with electrical energy, data, information, food products, commodities and/or consumables;

detecting, open-loop and/or closed-loop controlling operation, operator control and/or use of one or more infrastructure units by means of a central unit, in particular using data received from a person or a user unit.

The method according to the invention preferably has individual or a plurality of features and/or advantages which are described in conjunction with the modular infrastructure device according to the invention and/or the infrastructure system according to the invention.

It may be favorable if the method for operating one or more infrastructure devices is also a method for operating an infrastructure system, in particular an infrastructure system according to the invention. In this method, preferably a plurality of infrastructure devices are open-loop controlled and/or closed-loop controlled and/or coordinated with one another and/or evaluated, in particular with respect to energy efficiency with the overall infrastructure system, by means of a superordinate controller, in particular a superordinate monitoring system.

One or more infrastructure units can preferably have individual or a plurality of components as described below:

Electric charging pillar, locker, display screen, food product vending machine, motor vehicle accessory vending machine, ATM, automatic ticket machine, compressor, air pressure testing device, vacuum cleaner, lighting system, status display, in particular LED status lighting, wireless LAN, hot spot (W-LAN or WiFi hot spot), monitoring camera.

One or more infrastructure units preferably comprise an authentication device for registering and/or checking personal data and/or user unit data.

The modular infrastructure device preferably provides spatial integration of a multiplicity of components for a multiplicity of application possibilities and installation locations.

An electricity network connection, an energy generating system and/or data interfaces are preferably usable jointly for a plurality of persons and/or a plurality of user units.

The infrastructure device according to the invention is, in particular, extendable in a modular fashion.

The infrastructure device serves preferably for weatherproof installation and simultaneous supply of functional components in the open air with energy and for providing a broadband communication connection.

One or more infrastructure units can also preferably contain energy storage systems, information network components, image-forming devices, devices for measuring, open-loop and/or closed-loop control technology, etc.

One or more infrastructure units are preferably embodied and configured in such a way that they have an automated operating behavior and can interact with persons (operators or users).

The energy supply units of the infrastructure device according to the invention are preferably dimensioned in such a way that the infrastructure device can be operated in an autonomous mode in terms of energy. The infrastructure device can then be operated, in particular, "off grid". It is then preferably possible to dispense with an electricity network connection.

The modular infrastructure device is suitable, in particular, as a charging station for electric vehicles, wherein persons using the electric vehicles can use during a charging process, for example, further infrastructure units of the infrastructure device, for example functional units which serve everyday needs. These include, in particular, lockers, vending machines, charging possibilities for portable electrical devices or information screens.

The base unit and/or one or more infrastructure units preferably also comprise a bench seat for persons and one or more lock brackets or lock receptacle points for connecting and securing objects, for example bicycles.

In addition, there can be provision that a base unit and one or more infrastructure units comprise a garbage can, an ashtray, a water connection, a vacuum cleaner and/or an air pressure testing device.

An infrastructure unit for storing objects can be embodied, for example, as a locker. Such a locker is preferably dimensioned in such a way that in each case a helmet and a bag or a rucksack can be placed in it. A locker can also be provided, for example, with a socket for charging purposes or have a cooling function.

It may be favorable if each infrastructure unit comprises a display unit by means of which a person, in particular a potential user, can straight away recognize a state, in particular a readiness for operation or readiness for use, of the infrastructure unit. Such a display unit can be, in particular, an LCD or LED display with color coding, wherein, for example, a green light signals functional readiness and readiness for use, while, for example, an orange or red light signals a fault or use which has already taken place.

Alternatively or additionally to this, for an infrastructure device as a whole, it is possible to provide a central display unit for a plurality of infrastructure units, in particular all said units.

A base unit can also form, for example, roofing and/or housing for shopping carts, bicycles and/or cars.

Further preferred features and/or advantages of the invention are the subject matter of the following description and of the illustration of exemplary embodiments in the drawings.

BRIEF DESCRIPTION OF THE DRAWINGS

FIG. 4 shows a schematic illustration of the electrical design of an infrastructure unit of the infrastructure device;

FIG. 5 shows a schematic illustration of a monitoring system of an infrastructure system which comprises a plurality of infrastructure devices; and FIG. 6 shows a schematic perspective illustration of an infrastructure device which is provided with a multiplicity of infrastructure units.

Identical or functionally equivalent elements are provided with the same reference symbols in all the Figures.

DETAILED DESCRIPTION OF THE DRAWINGS

Figure 1:
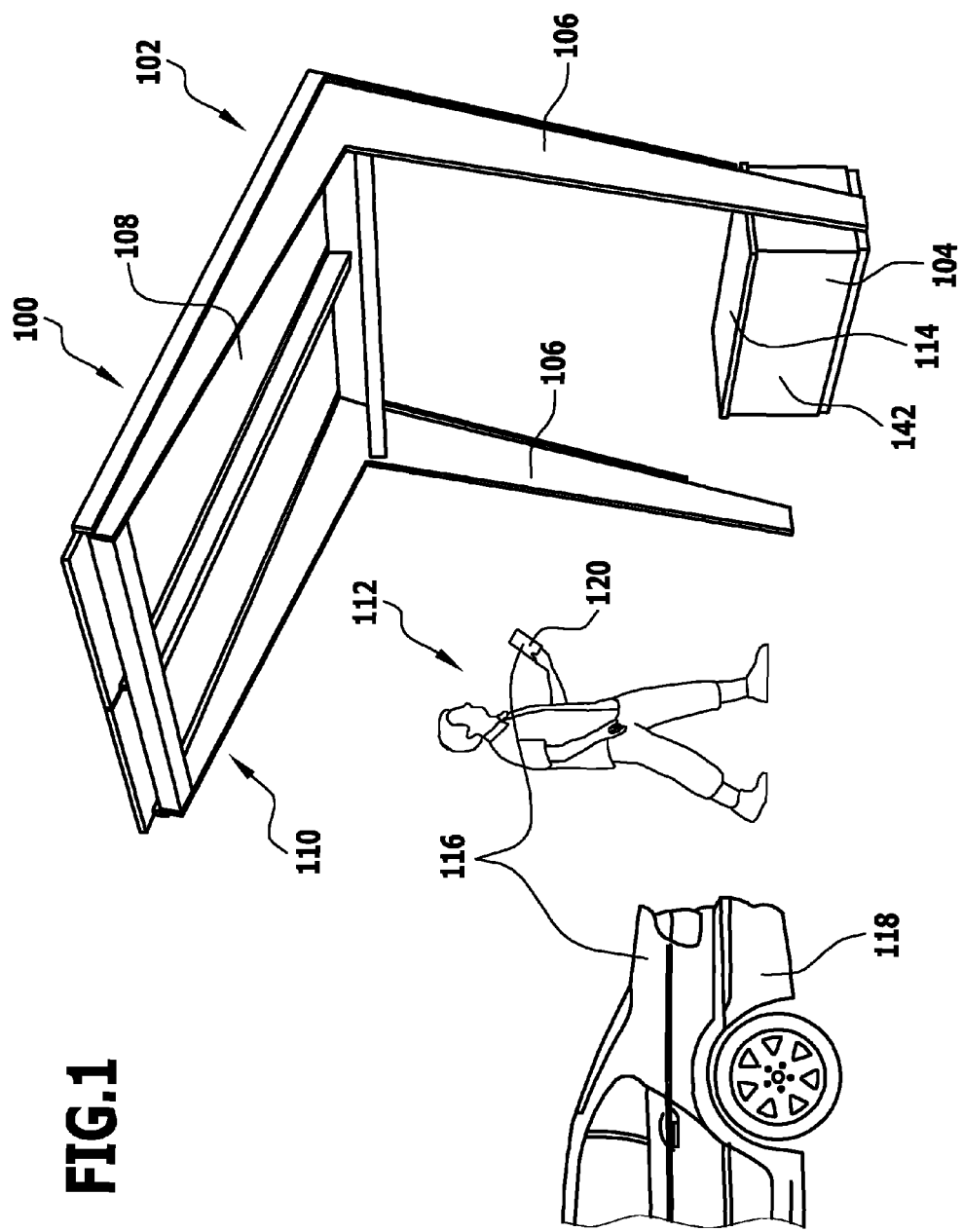
FIG. 1 shows a schematic perspective illustration of a first embodiment of a modular infrastructure device.

One embodiment illustrated in FIGS. 1 to 4 of an infrastructure device which is denoted in its entirety by 100 comprises a base unit 102 and one or more infrastructure units 104.

The base unit 102 comprises two or more supporting elements 106 which support one or more roof elements 108.

The base unit 102 thus comprises, in particular, a roofing unit 110 by means of which a roofed area is formed in which, for example, persons 112 may be located in order to protect themselves against rain, for example.

A conventional infrastructure device 100 does not provide more than protection against undesired precipitation. At most it is only possible to provide a bench 114 on which a person 112 can sit.

In contrast, in the case of the embodiment of an infrastructure device 100 illustrated in FIGS. 1 to 4 there is provision that the infrastructure device 100 supplies a person 112 and/or a user unit 116, for example a vehicle 118 and/or a smartphone 120, with electrical energy, data, information, food products, commodities and/or consumables.

The base unit 102 serves here to accommodate preferably a plurality of infrastructure units 104 of different types and with different functions.

Figure 2:
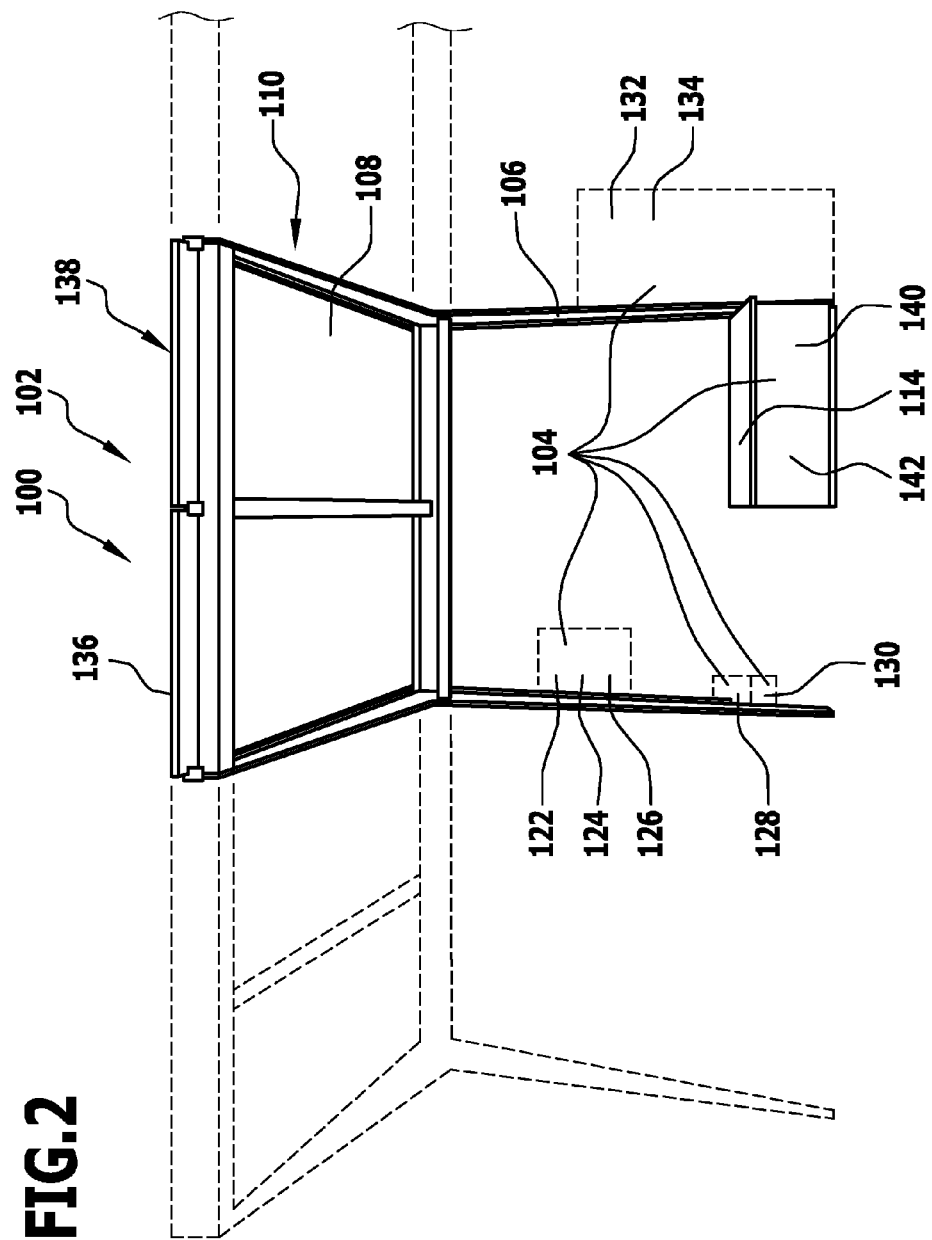
FIG. 2 shows a schematic view from the front of the modular infrastructure device from FIG. 1, wherein additional infrastructure units of the infrastructure device and extension of a base unit of the infrastructure device are illustrated by dashed lines.

As is apparent, in particular, from FIG. 2, for example infrastructure units 104 which comprise the following or are embodied as the following can be provided and arranged on the base unit 102:

an information unit 122, a display unit 124, a communication unit 126, a transceiver unit 128, a power connection 130, a provision device 132, etc.

Information for a person 112 can be provided, in particular displayed, by means of an information unit 122. For example, this information can concern advertising, messages, timetables for buses or trains, etc.

A display unit 124 serves, in particular, to display operating states and/or use states of individual or of a plurality of infrastructures units 104.

A person 112 can preferably interact with one or more infrastructure units 104 by means of a communication unit 126.

A transceiver unit 128 is also embodied, for example, as a communication unit 126 and serves, for example, to provide wireless internet access.

A power connection 130 serves, in particular, to provide electrical energy, in particular to charge portable electrical devices and/or electric vehicles, for example electrically driven passenger cars or bicycles.

A provision device 132 is embodied, for example, as a vending machine 134. A person 112 can, for example, acquire food products, in particular meals or beverages, or other objects, for example passenger car consumables, at a provision device 132.

The infrastructure device 100 preferably comprises one or more independent supply units 136, for example one or more solar cell units 138.

Electrical energy can in particular be generated by means of an independent supply unit 136, by using solar energy and/or wind energy. This electrical energy serves, in particular, to operate the infrastructure device 100, but can also be provided for user units 116, in particular in order to charge electric vehicles or electrical devices.

Electrical energy can preferably be stored by means of a storage device 140 of the infrastructure device 100. In particular, electrical energy which is generated by means of the independent supply unit 136 can be stored and provided at a later time by means of the storage device 140.

As is also apparent from FIG. 2, the base unit 102 of the infrastructure device 100 is itself of modular design.

It is therefore possible, for example by adding just one further supporting element 106, to arrange at least one further roof element 108 in order to extend the accommodation area, in particular the roofing unit 110, for persons 112.

The infrastructure device 100 preferably comprises a central unit 142 by means of which a plurality of infrastructure units 104, in particular all the infrastructure units 104, are configured to be open-loop controlled, closed-loop controlled and/or coordinated with one another.

Figure 3:
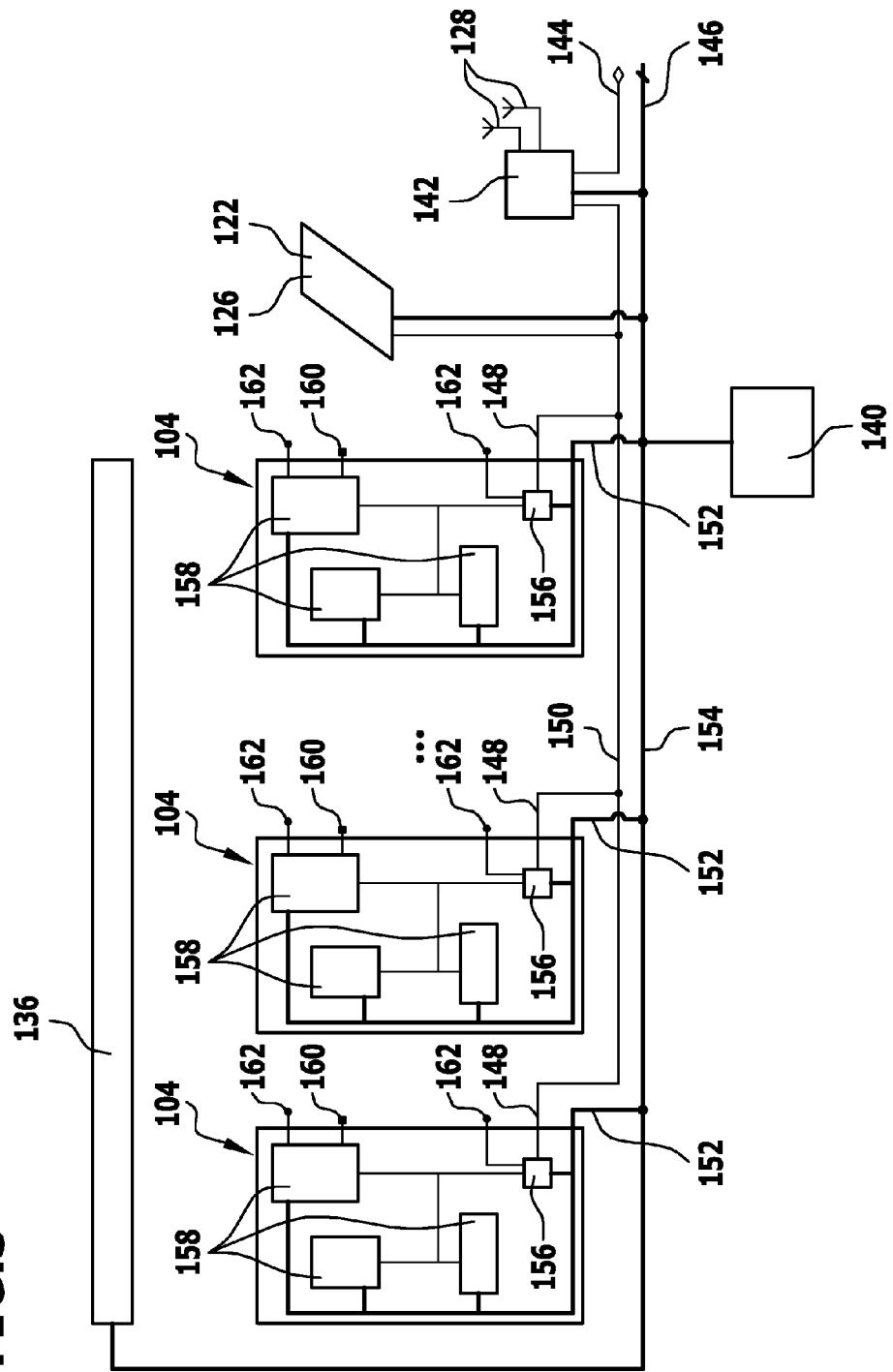
FIG. 3 shows a schematic illustration of the electrical design of the infrastructure device.

As is apparent, in particular, from FIGS. 3 and 4, the infrastructure device 100 is connected in its entirety to the internet by means of an internet connection 144.

By means of an electricity network connection 146, the infrastructure device 100 is connected in its entirety to the electricity network, in particular to the public electricity grid or to an electricity network of a separate energy supplier.

All the infrastructure units 104 of the infrastructure device 100 are connectable, when necessary, to the internet or continuously connected to the internet and, when necessary, suppliable with electrical energy or connected constantly to the electricity network via the internet connection 144 and the electricity network connection 146.

Each infrastructure unit 104 comprises, for this purpose, in each case a data connection 148 for connecting to a data network 150 of the infrastructure device 100 and an electrical connection 152 for connecting to an energy network 154 of the infrastructure device 100.

All the infrastructure units 104 are connected via the data network 150 to the central unit 142, to one or more communication units 126, to one or more information units 122, to one or more transceiver units 128 and/or to the internet connection 144.

All the infrastructure units 104 are preferably connected via the energy network 154 to one or more independent supply units 136, to one or more storage devices 140 and/or to the electricity network connection 146.

The central unit 142 is also connected to the energy network 154.

As is apparent, in particular, from FIG. 4, an infrastructure unit 104 preferably also comprises an internal checking unit 156 by means of which the actual functions of the infrastructure unit 104 are preferably configured to be executed and checked. In addition, one or more functional components 158 for carrying out these actual functions of the infrastructure unit 104 are provided for each infrastructure unit 104. Interaction with further components of the infrastructure device 100 and/or with a person 112 or a user unit 116 can preferably be carried out via one or more signal outputs 160, as an alternative to the data connection 148.

Finally, one or more sensors 162 of an infrastructure unit 104 serve to detect person-related data and/or functional data of the infrastructure unit 104, with the result that, in particular, a reliable function of the functional components 158 can be ensured.

According to FIG. 3, for example, three infrastructure units 104 are controllable centrally, in particular closed-loop controlled and/or coordinated, by means of the central unit 142.

A superordinate communication unit 126 and/or information unit 122 preferably serve here for interaction with a person 112.

The infrastructure device 100 described above is used as follows:

For example, a person 112 operates one or more infrastructure units 104 of the infrastructure device 100 at a communication unit 126.

The person 112 enters, for this purpose, for example, person-related data and/or billing data via an input field of the communication unit 126, in order to be able to make use of infrastructure services of the infrastructure device 100.

For example, the person 112 can purchase infrastructure services.

Such an infrastructure service is, for example, the provision of electrical energy for charging a vehicle 118 of the person 112.

The person 112 can, for this purpose, use for example, an electrical cable (not illustrated) in order to connect a vehicle 118 to an infrastructure unit 104 which is embodied as a power connection 130. A charging process of the vehicle 118 can then be initiated via the communication unit 126.

The electrical energy used to charge the vehicle 118 is provided, for example, via one or more independent supply units 136 of the infrastructure device 100 and/or via the electricity network connection 146, and, if appropriate, is also buffered by means of the storage device 140.

During the charging process, the person 112 can use further infrastructure units 104 of the infrastructure device 100. For example, the person 112 can acquire a beverage at a vending machine 134 or can use his own smartphone 120 to connect to the internet via a transceiver unit 128 of the infrastructure device 100.

The infrastructure device 100 illustrated in FIGS. 1 to 4 can be, for example, a component of an infrastructure system 164.

As is apparent, in particular, from FIG. 5, such an infrastructure system 164 preferably comprises a plurality of infrastructure devices 100 which in turn each comprise a plurality of infrastructure units 104.

The central units 142 of each infrastructure device 100 can preferably be open-loop and/or closed-loop controlled by means of a monitoring system 166 of the infrastructure system 164, in order ultimately to be able to monitor all the infrastructure devices 100 via a central system, specifically the monitoring system 166.

This monitoring serves, on the one hand, to check whether the infrastructure devices 100 are functioning without faults. On the other hand, for example, central user administration can also be implemented via the monitoring system 166, with the result that persons 112 can easily and conveniently access the infrastructure services without complicated and laborious inputting of the user data on all the infrastructure devices 100.

Finally, FIG. 6 also shows a specific embodiment of an infrastructure device 100 in which the roof elements 108 are provided completely with solar cell units 138 in order to be able to provide the largest possible quantity of electrical energy.

This electrical energy is configured to be provided, for example, via two infrastructure units 104 which are embodied as charging pillars (power connections 130), and, in particular, is configured to be output to vehicles 118.

In addition, the infrastructure device 100 illustrated in FIG. 6 comprises a central display 168 which serves as a communication unit 126, as a display unit 124 and, in particular, as an information unit 122.

A vending machine 134 and a plurality of infrastructure units 104 which are embodied as lockers 170 provide further infrastructure services for the users (persons 112) of the infrastructure device 100.

LIST OF REFERENCES NUMBERS

100 Infrastructure device
102 Base unit
104 Infrastructure unit
106 Supporting element
108 Roof element 110 Roofing unit
112 Person
114 Bench
116 User unit
118 Vehicle
120 Smartphone
122 Information unit
124 Display unit
126 Communication unit
128 Transceiver unit
130 Power connection
132 Provision device
134 Vending machine
136 Independent supply unit
138 Solar cell unit
140 Storage device
142 Central unit
144 Internet connection
146 Electricity network connection
148 Data connection
150 Data network
152 Electrical connection
154 Energy network
156 Checking unit
158 Functional component
160 Signal output
162 Sensor
164 Infrastructure system
166 Monitoring system
168 Display
170 Locker

The invention claimed is:

1. A modular infrastructure device, comprising:
at least one base unit comprising two or more supporting elements which support one or more roof elements in such a way that the base unit comprises a roofing unit by means of which a roofed area is formed;
multiple infrastructure units comprising one or more connecting devices for connecting the multiple infrastructure units to one or more user units;
one or more independent supply units for generating and/or providing electrical energy;
a central unit which is coupled to the multiple infrastructure units, the one or more user units and the one or more independent supply units, wherein the central unit and the multiple infrastructure units are embodied and configured in such a way that:
a) operation, operator control and use of the multiple infrastructure units and the one or more independent supply units are detected, open-loop and/or closed-loop controlled and/or are signaled to a superordinate monitoring system by means of the central unit, and
b) an infrastructure service which is made use of by a person or a user unit is detected; and
a payment system with at least one of RFID, insertion of coins, insertion of bank notes, magnetic card, credit card and smartphone connection (App) for billing the infrastructure service which is made use of.

2. The modular infrastructure device as claimed in claim 1, wherein one or more infrastructure units comprise a communication unit, an information unit, a storage unit, a display unit and/or a provision device.

3. The modular infrastructure device as claimed in claim 1, wherein electrical energy, data, information, food products, commodities and/or consumables are providable for one or more user units and/or for one or more persons by means of one or more infrastructure units.

4. The modular infrastructure device as claimed in claim 1, wherein one or more user units are mobile units, for example electrical vehicles, smartphones, etc.

5. The modular infrastructure device as claimed in claim 1, wherein the at least one base unit is itself of modular design.

6. An infrastructure system, comprising one or more modular infrastructure devices as claimed in claim 1.

7. A method for operating one or more infrastructure devices as claimed in claim 1, wherein said infrastructure system comprises one or more modular infrastructure devices, and wherein the method comprises the following:
Providing multiple infrastructure units for supplying persons or objects with electrical energy, data, information, food products, commodities and/or consumables; and
Detecting, open-loop and/or closed-loop controlling of at least one of operation, operator control and use of the multiple infrastructure units by means of a central unit.

* * * * *